(12) United States Patent
Glick et al.

(10) Patent No.: US 9,680,247 B1
(45) Date of Patent: Jun. 13, 2017

(54) ROUND TERMINAL WITH LOW PROFILE CAP

(71) Applicant: Lear Corporation, Southfield, MI (US)

(72) Inventors: Michael Glick, Farmington Hills, MI (US); Tulasi Sadras-Ravindra, Canton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/060,735

(22) Filed: Mar. 4, 2016

(51) Int. Cl.
*H01R 13/187* (2006.01)
*B60L 11/18* (2006.01)

(52) U.S. Cl.
CPC ........ *H01R 13/187* (2013.01); *B60L 11/1818* (2013.01)

(58) Field of Classification Search
CPC .. H01R 13/187; H01R 13/53; H01R 13/5219; H01R 13/6275; B60L 11/1818
USPC .......................................................... 439/843
See application file for complete search history.

(56) References Cited

U.S. PATENT DOCUMENTS

| | | | |
|---|---|---|---|
| 5,591,039 A | | 1/1997 | Matthews |
| 5,667,413 A | * | 9/1997 | Trafton .............. H01R 13/5219 439/271 |
| 6,254,439 B1 | * | 7/2001 | Endo ................... H01R 13/187 439/843 |
| 6,358,104 B2 | * | 3/2002 | Daugherty ........... H01R 13/187 439/851 |
| 6,848,922 B2 | * | 2/2005 | Coughlan .............. H01R 13/53 439/181 |
| 6,875,063 B2 | * | 4/2005 | Zhao .................... H01R 13/187 439/787 |
| 7,037,127 B2 | | 5/2006 | Williams |
| 8,430,698 B2 | | 4/2013 | Stewart et al. |
| 8,808,039 B2 | * | 8/2014 | Mott .................. H01R 13/6275 439/843 |
| 8,840,436 B2 | | 9/2014 | Mott et al. |
| 9,325,095 B2 | * | 4/2016 | Glick ................... H01R 13/187 |

FOREIGN PATENT DOCUMENTS

DE 102009053778 6/2011

* cited by examiner

*Primary Examiner* — Jean F Duverne
(74) *Attorney, Agent, or Firm* — MacMillan, Sobanski & Todd, LLC

(57) ABSTRACT

An electric connector terminal body defines an interior space that extends along an axis. An electric contact located within the interior space includes a contact base and a plurality of contact arms that extend from the contact base toward an outer end of the terminal body. An end cap located on the outer end of the terminal body includes a cap base that defines a cap opening that is co-axial with the interior space. The end cap also includes a flange that extends from the cap base in an inner direction into the interior space of the terminal body. The flange includes an engagement tab that extends from the flange in a radial direction generally perpendicular to the axis of the interior space and engages a terminal groove located in a wall of the interior space.

20 Claims, 4 Drawing Sheets

ROUND TERMINAL WITH LOW PROFILE CAP

BACKGROUND OF THE INVENTION

The present invention relates in general to electric terminals and, more specifically, to a barrel-type cylindrical electric terminal.

Electric connectors may be used in automobiles, for example, in connecting an electric vehicle to an external power source in order to charge batteries on the vehicle. One type of round electric connector includes a cylindrical female connector and a male pin connector that is inserted into the female connector. The female connector includes an electric contact that is biased into contact with the male pin. The electric contact is typically a sheet metal spring that includes multiple flexible, inwardly-bent arms. The male pin engages the arms and pushes them outwardly, establishing electrical contact between the female connector and the male connector. In one design of round terminal, the female connector includes an open end that allows insertion of the electric contact during assembly of the connector. An end cap is attached to the female connector to close the open end and trap the electric contact inside. The end cap includes an opening that is small enough to keep the electric contact trapped inside, but is large enough to allow insertion of the male pin. It is often desirable to reduce the overall size of the electric connectors, as well as the size of the end cap. It is also desirable to have to an end cap that engages the female connector in an improved manner.

SUMMARY OF THE INVENTION

This invention relates to an electric connector. The electric connector includes a terminal body that defines an interior space that extends along an axis. An electric contact is located within the interior space and includes a contact base and a plurality of contact arms that extend from the contact base toward an outer end of the terminal body. An end cap is located on the outer end of the terminal body. The end cap includes a cap base that defines a cap opening that is co-axial with the interior space. The end cap also includes a flange that extends from the cap base in an inner direction into the interior space of the terminal body. The flange includes an engagement tab that extends from the flange in a radial direction generally perpendicular to the axis of the interior space and engages a terminal groove located in a wall of the interior space.

In another embodiment, the electric connector includes a terminal body that defines an interior space extending along an axis. An electric contact is located within the interior space and includes a contact base and a plurality of contact arms that extend from the contact base toward an outer end of the terminal body. An end cap is located on the outer end of the terminal body. The end cap includes a cap base and a first flange that extends from the cap base in an inner direction parallel to the axis and into the interior space of the terminal body. The first flange defines a cap opening that is co-axial with the interior space. The end cap also includes a second flange that extends from the cap base in the inner direction. The second flange describes a complete O-shape that extends completely around the cap opening. The second flange includes an engagement tab that extends from the second flange in a radial direction away from the axis. The engagement tab is located in a terminal groove located in a wall of the interior space of the terminal body such that the engagement tab engages the terminal body to prevent movement of the end cap relative to the terminal body in a direction parallel to the axis.

In another embodiment, the electric connector includes a terminal body that defines an interior space extending along an axis. An electric contact located within the interior space and includes a contact base and a plurality of contact arms that extend from the contact base toward an outer end of the terminal body to respective arm ends. An end cap is located on the outer end of the terminal body. The end cap includes a cap base and a first flange that extends from the cap base in an inner direction parallel to the axis and into the interior space of the terminal body. The first flange defines a cap opening that is co-axial with the interior space. The end cap also includes a second flange that extends from the cap base in the inner direction. The second flange describes a complete O-shape that extends completely around the cap opening. The second flange includes an engagement tab that extends from the second flange in a radial direction away from the axis. The engagement tab is located in a terminal groove located in a wall of the interior space of the terminal body such that the engagement tab engages the terminal body to prevent movement of the end cap relative to the terminal body in a direction parallel to the axis. The contact arms of the electric contact engage the first flange and are biased away from the axis by the first flange.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
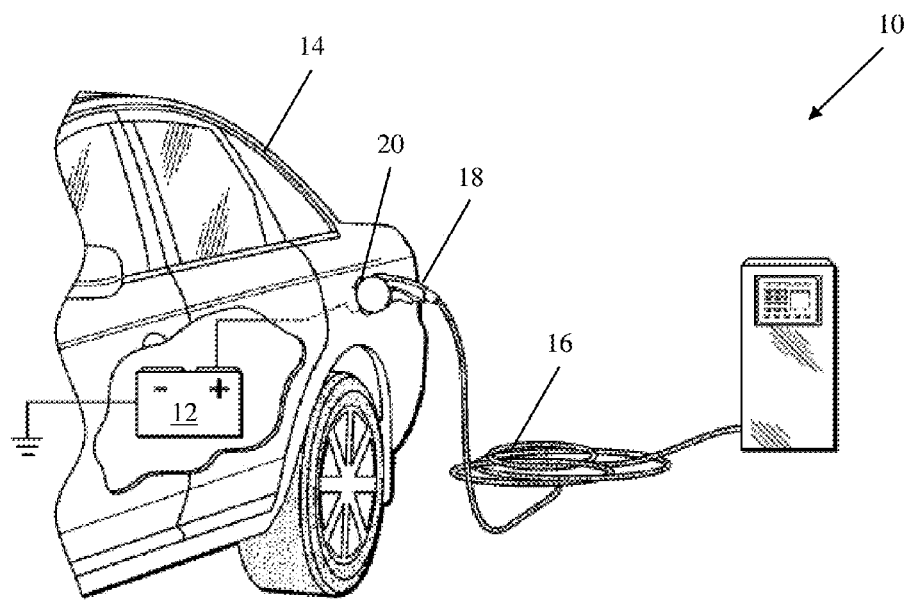
FIG. 1 is a perspective view of a vehicle charging system.

Referring now to the drawings, there is illustrated in FIG. 1 a charging system, indicated generally at 10. The charging system 10 is operable to charge a battery 12 in a vehicle 14 using an external source of power. The charging system 10 includes a cord 16 and an attached connector assembly 18. The connector assembly 18 is configured to mate with a charging port 20 on the vehicle to allow the charging system 10 to connect the external source of power to the battery 12.

Figure 2:
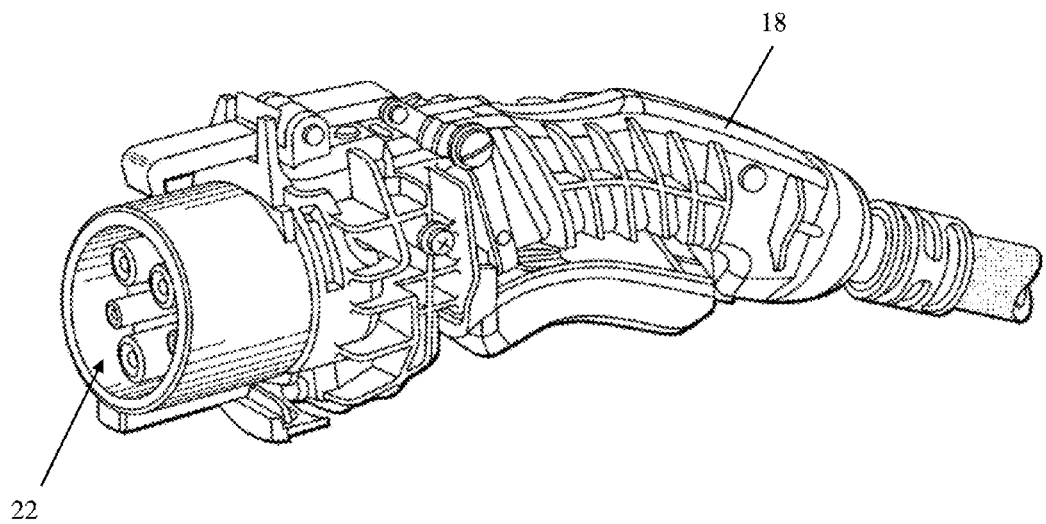
FIG. 2 is an enlarged perspective view of a connector assembly of the vehicle charging system shown in FIG. 1.

Referring now to FIG. 2, a perspective view of the connector assembly 18 is shown. The connector assembly 18 includes a plurality of female connector terminals, indicated generally at 22. The connector terminals 22 are positioned and arranged to engage a plurality of corresponding male pin terminals (not shown) included in the charging port 20. The number of connector terminals 22 shown is for illustrative purposes only and may be other than that shown, if desired. When the connector assembly 18 is mated with the charging port 20, the female connector terminals 22 mate with the corresponding male pin terminals to provide circuits for electric current, data transfer, or any other desired purpose.

Figure 3:
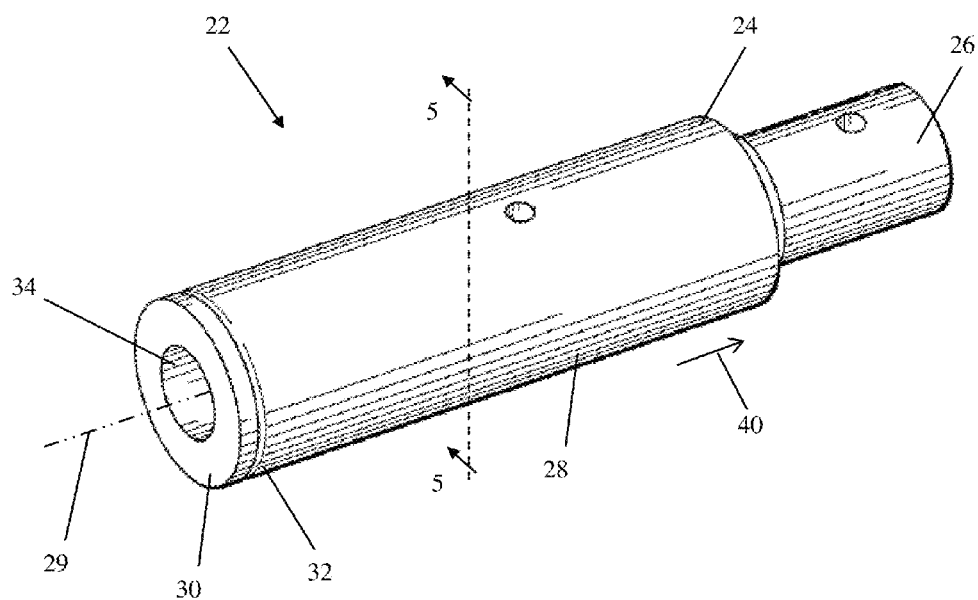
FIG. 3 is a further enlarged perspective view of a connector terminal of the connector assembly shown in FIG. 2.

Referring now to FIG. 3, a perspective view of one connector terminal 22 is shown. The connector terminal 22 includes a terminal body 24 including a connection portion 26 and a terminal portion 28. The connection portion 26 is configured to connect to the connector assembly 18, while the terminal portion 28 is configured to mate with one of the male pin terminals on the charging port 20 along an axis 29. The illustrated terminal body 24 is made of a single piece of electrically-conductive material and the connection portion 26 is integral with the terminal portion 28. However, the terminal body 24 may be made of any desired material and may have any desired shape or configuration, and the connection portion 26 and the terminal portion 28 may be separate components. The connector terminal 22 also includes an end cap 30 attached to an outer end 32 of the terminal portion 28. The illustrated end cap 30 is made of an electrically-insulating material. However, the end cap 30 may be made of any desired material. The end cap 30 defines a cap opening 34, the purpose of which will be described below.

Figure 4:
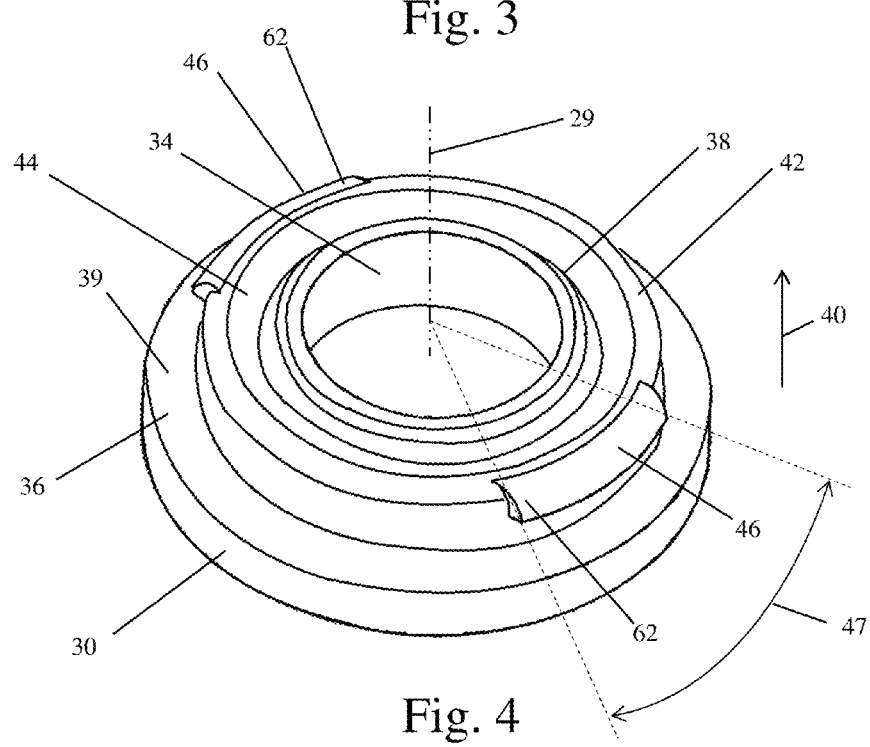
FIG. 4 is a further enlarged perspective view of an end cap of the connector terminal shown in FIG. 3.

Referring to FIG. 4, a perspective view of the end cap 30 is shown. The illustrated end cap 30 includes a cap base 36 and a first flange 38 that extends from an inner surface 39 of the cap base 36 in an inner direction 40. As best shown in FIG. 3, when the end cap 30 is installed on the connector terminal 22, the first flange 38 extends into the connector terminal 22 parallel to the axis 29. Referring back to the FIG. 4, the first flange 38 describes a complete O-shape that extends completely around and defines the cap opening 34. However, the first flange 38 may have a different shape, may not extend completely around the cap opening 34, and there may be breaks in the first flange 38, if desired. The end cap 30 also includes a second flange 42 that extends from the inner surface 39 of the cap base 36 in the inner direction 40. The illustrated second flange 42 describes a complete O-shape that extends completely around the first flange 38. However, the second flange 42 may have a different shape, not extend completely around the first flange 38, and there may be breaks in the second flange 42, if desired. The second flange 42 includes two engagement tabs 46 that extend from the second flange 42 in a radial direction, generally perpendicular to the axis 29 and away from the cap opening 34. The second flange 42 may include a different number of engagement tabs 46. Each illustrated engagement tab 46 has an arc length 47 that is approximately 25% of the circumference of the second flange 42. However, the engagement tabs 46 may have any other desired size. Although the illustrated engagement tabs 46 are shown on opposed sides of the second flange 42, it should be appreciated that the engagement tabs 46 may be disposed around the second flange 42 in any desired distribution. The second flange 42 is separated from the first flange 38 by a cap groove 44. The illustrated cap groove 44 describes a complete O-shape that extends fully between the first flange 38 and the second flange 42. In the illustrated embodiment, the first flange 38 extends from the cap base 36, the second flange 42 extends from the cap base 36, and the cap groove 44 fully separates the first flange 38 from the second flange 42.

Figure 5:
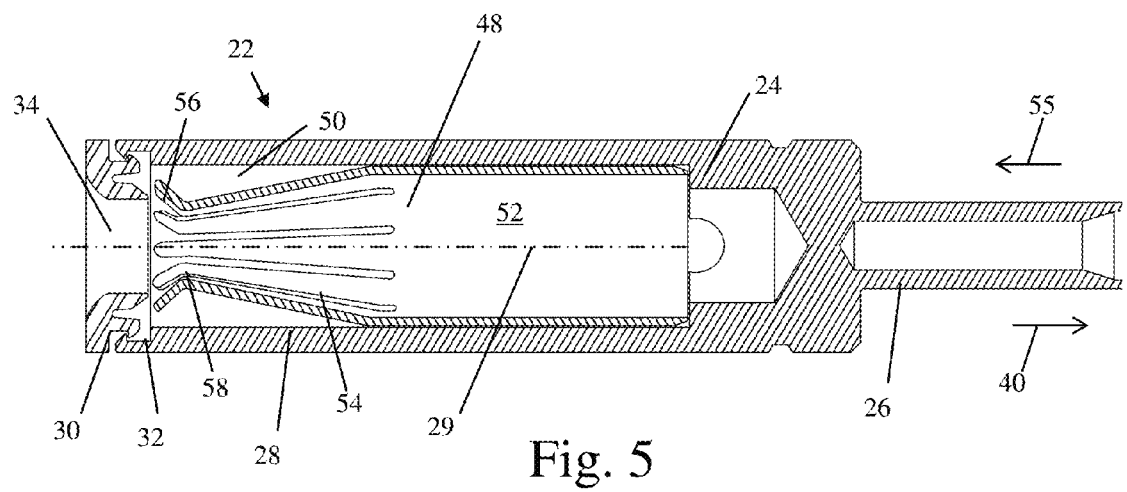
FIG. 5 is a cross sectional view of the connector terminal taken along the line 5-5 of FIG. 3.

Referring to FIG. 5, a cross-sectional view of the connector terminal 22, taken along the line 5-5 of FIG. 3, is shown. As shown, the connector terminal 22 includes an electric contact 48 that is located in a terminal interior space 50. The illustrated contact 48 is made from a piece of stamped sheet steel, but may be made of any desired material and method of manufacture. The illustrated contact 48 includes a contact base 52 that is shaped into a ring that is located around the axis 29. The illustrated contact 48 is pre-stressed when it is inserted into the terminal interior space 50 so that the contact base 52 is biased into engagement with the inner wall of the terminal body 24. The illustrated contact 48 also includes a plurality of contact arms 54 that extend from the contact base 52 in an outward direction 55, opposite the inner direction 40, to respective arm ends 56. The contact arms 54 are located around the axis 29, and each contact arm 54 is angled inwardly toward to the axis 29 from the contact base 52 up to a respectively arm contact area 58. Each contact arm 54 is further angled outwardly away from the axis 29 from the respective arm contact area 58 to the respective arm end 56. In the illustrated embodiment, the contact area 58 of each of the contact arms 54 is located approximately the same distance from the contact base 52 in the outward direction 55, but this is not necessary.

Figure 6:
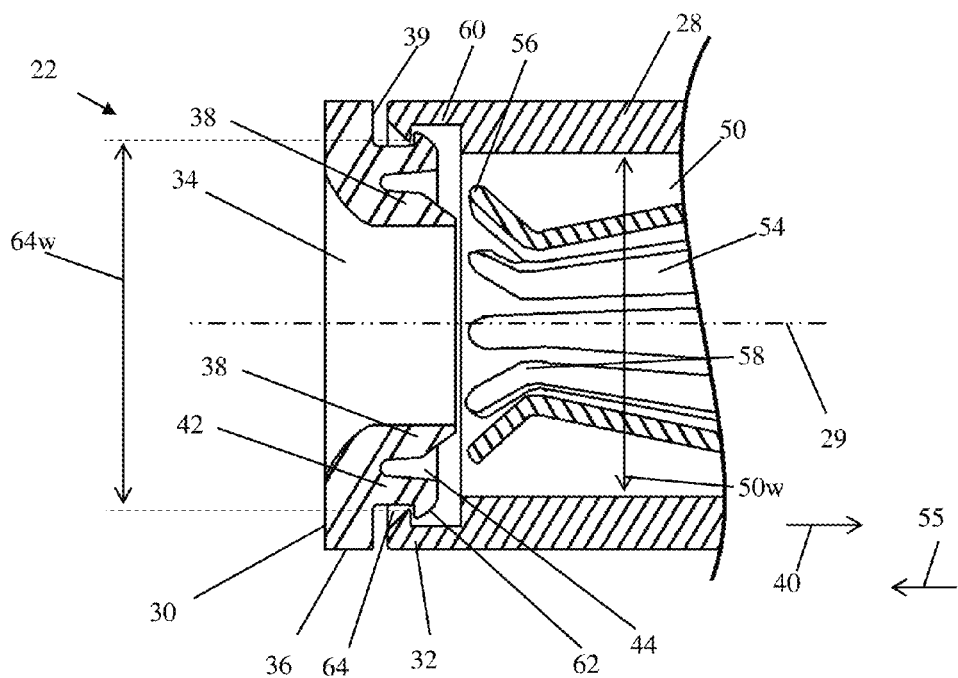
FIG. 6 is an enlarged detail view of a portion of FIG. 5 showing the engagement of the end cap.

Referring to FIG. 6, a detailed view of the outer end 32 of the terminal portion 28 and the attached end cap 30 is shown. The connector terminal 22 includes a terminal groove 60 that is located in the inner wall of the portion of the terminal body 24 that defines the interior space 50. As shown, the engagement tabs 46 on the second flange 42 of the end cap 30 include respective cap sloped engagement surfaces 62. Additionally, the outer end 32 of the terminal portion 28 includes a terminal sloped engagement surface 64. The cap sloped engagement surfaces 62 and the terminal sloped engagement surface 64 are complementary surfaces that engage each other when the end cap 30 is attached to the open outer end 32 of the terminal portion 28. When the end cap 30 is moved relative to the terminal portion 28 along the axis 29 in the inner direction 40, the cap sloped engagement surfaces 62 of the engagement tabs 46 of the end cap 30 engage the terminal sloped engagement surface 64 of the outer end 32 of the terminal portion 28. Because the end cap 30 is made of a resilient material, the engagement tabs 46 and portions of the second flange 42 of the end cap 30 are therefore deflected inwardly toward the axis 29. The second flange 42 moves through its elastic deformation range and, when the end cap 30 is moved far enough in the inner direction 40, the engagement tabs 46 and portions of the second flange 42 of the end cap 30 rebound outwardly away from the axis 29. The engagement tabs 46 then snap into the terminal groove 60. This is the position of the end cap 30 shown in FIGS. 5 and 6. In this position, the engagement tabs 46 of the end cap 30 engage the terminal groove 60 of the terminal portion 28 to prevent relative movement of the end cap 30 in the outward direction 55. It should be appreciated that providing the engagement tabs 46 with a different arc length 47 will change the amount of the engagement tab 46 that is engaged with the terminal groove 60. For example, if the arc length 47 is larger than that illustrated, there will be more engagement tab 46 located in the terminal groove 60. Additionally, if the arc length 47 is smaller than that illustrated, there is a lesser amount of the second flange 42 that is able to deflect during installation of the end cap 30 onto the terminal body 24. As a result, that smaller amount of the second flange 42 would be subject to a larger force. This would increase the amount of force necessary to attach the end cap 30 to the terminal body 24, as well as the amount of force necessary to remove the end cap 30 from the terminal body. The size of the arc length 47 may be different from that shown in order to obtain a desired engagement force or release force between the end cap 30 and the terminal body 24. It should be appreciated that as the second flange 42 is deflected when the end cap 30 is attached to the terminal portion 28, the first flange 38 is not deflected because the cap groove 44 is located between the second flange 42 and the first flange 38. The second flange 42 is deflected when the engagement tabs 46 engage the terminal portion 28, and the first flange 38 is not deflected, because the cap groove is located between the engagement tabs 46 and the first flange 38. Additionally, it should be appreciated that because the first flange 38 is not deflected when the end cap 30 is attached to the terminal portion 28, the shape of the cap opening 34 is not altered when the end cap 30 is attached to the terminal portion 28.

As further seen in reference to FIG. 6, the terminal interior space 50 has a terminal interior width 50w, and the terminal sloped engagement surface 64 has an engagement interior width 64w that is greater than the terminal interior width 50w. In the illustrated embodiment, each of these widths 50w and 64w is a diameter that defines a circular opening around the axis 29. However, the widths 50w and 64w may be other than diameters if the openings have non-circular shapes. The opening in the terminal portion 28 defined by the terminal sloped engagement surface 64 is larger than the terminal interior space 50. However, the terminal interior space 50 and the terminal sloped engagement surface 64 may have relative sizes different from those illustrated, if desired.

In the embodiment illustrated in FIG. 6, the contact area 58 of each contact arm 54 is located approximately the same distance from the end cap 30 in the inner direction 40. The illustrated contact 48 is made of a resilient material, and each contact arm 54 is shown in its respective rest position, when there are no external loads applied to the contact arms 54. When the contact arms 54 are in their respective rest positions, the respective contact area 58 of each contact arm 54 is located approximately the same distance from the axis 29. However, this is not necessary, and the contact areas 58 may be in different relative positions. Additionally, in the illustrated embodiment, the respective arm end 56 of each contact arm 54 is located approximately the same distance from the end cap 30 in the inner direction 40, and the respective arm end 56 of each contact arm 54 is located approximately the same distance from the axis 29. However, this is not necessary, and the arm ends 56 may be in different relative positions. As illustrated, the distance between each arm end 56 and the axis 29 is greater than the distance between the first flange 38 and the axis 29. Thus, the space between the respective arm ends 56 is larger than the size of the cap opening 34.

Figure 7:
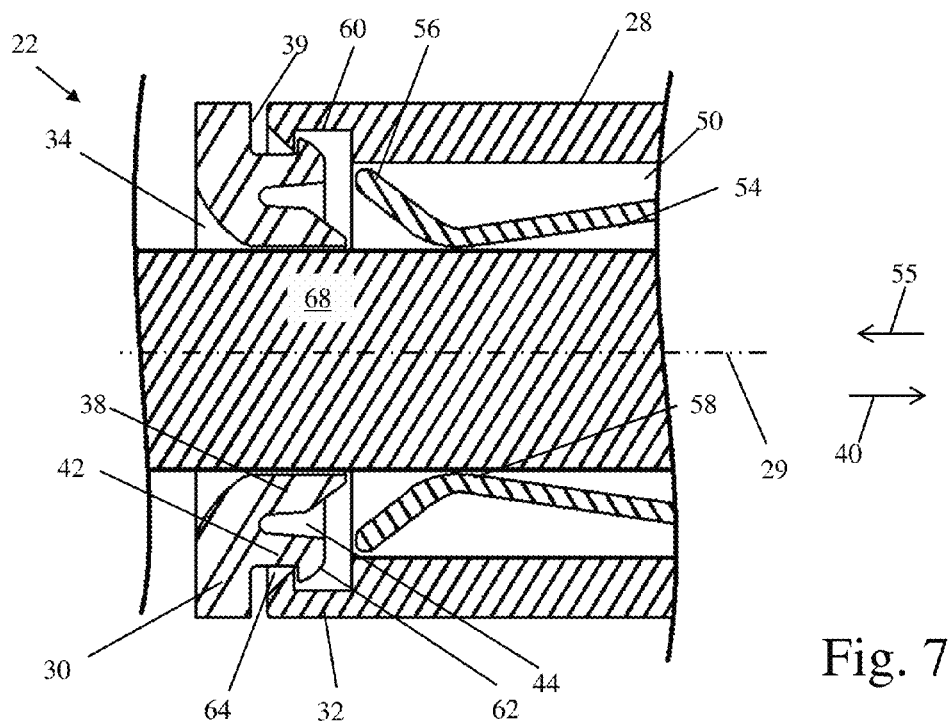
FIG. 7 is a cross-sectional view similar to FIG. 6 showing a corresponding pin terminal inserted into the connector terminal.

Referring to FIG. 7, a cross-sectional view similar to that of FIG. 6 is shown, with a corresponding male pin terminal 68 inserted into the connector terminal 22. The corresponding pin terminal 68 is included in the charging port 20, as described above in reference to FIG. 2. The corresponding pin terminal 68 is inserted into the connector terminal 22 through the cap opening 34 by moving the corresponding male pin terminal 68 relative to the connector terminal 22 along the axis 29 in the inner direction 40. In further reference to FIG. 6, the corresponding male pin terminal 68 has an outer width that is approximately the same size as an inner width of the cap opening 34. This allows the cap opening 34 to help guide the corresponding pin terminal 68 into proper alignment with the connector terminal 22. When the corresponding male pin terminal 68 is inserted into the connector terminal 22, the corresponding male pin terminal 68 engages the contact area 58 of each contact arm 54 and pushes the contact arms 54 in a radial direction away from the axis 29. It should be appreciated that corresponding male pin terminal 68 will engage the contact areas 58 of each contact arm 54 at approximately the same time. However, if the contact areas 58 of different contact arms 54 are located different distances from the end cap 30, or different distances from the axis 29, the corresponding male pin terminal 68 may engage one or more of the contact arms 54 at different times as the corresponding male pin terminal 68 is inserted into the connector terminal 22.

Figure 8:
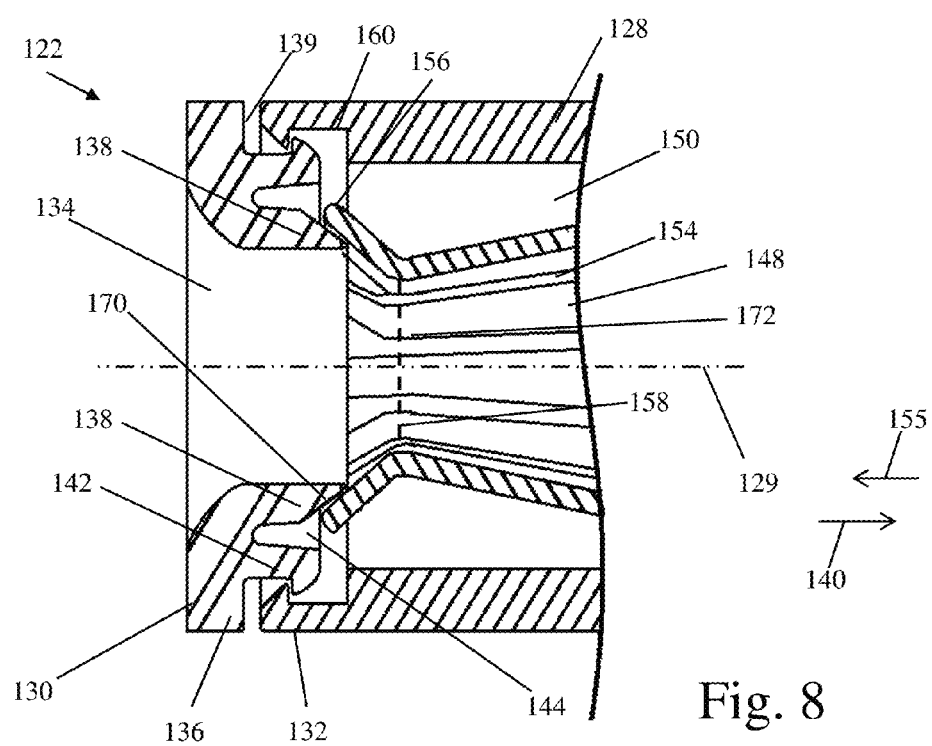
FIG. 8 is a cross-sectional view similar to FIG. 6 showing details of an alternative connector terminal embodiment.

Referring now to FIG. 8, a cross-sectional detail of a portion of an alternative connector terminal 122, similar to the view shown in FIG. 6, is illustrated. The alternative connector terminal 122 is substantially the same as previously described connector terminal 22, and similar components are identified with the same number with the addition of 100. The alternative connector terminal 122 differs from the connector terminal 22 in the interaction between a contact 148 and an end cap 130. Thus, no other parts of the alternative connector terminal 122 will be described in detail.

FIG. 8 is a detailed view of an outer end 132 of a terminal portion 128 and the attached end cap 130. As shown, the alternative connector terminal 122 includes a plurality of contact arms 154 that extend in an outward direction 155 so that the contact arms 154 engage a first flange 138 of the end cap 130. As can be seen by comparing FIG. 8 to FIG. 6, the alternative connector terminal 122 includes contact arms 154 that extend farther in the outward direction 155 relative to the end cap 130 than the contact arms 54 of the previously described connector terminal 22 extend relative to the end cap 30. It should be appreciated that this can be accomplished by the alternative contact 148 being longer in a direction measured along an axis 129, or by an alternative terminal portion 128 being shorter in the direction measured along the axis 129. Alternatively, first flange 138 of the end cap 130 could extend farther in an inner direction 140 so that the contact arms 154 engage a first flange 138 of the end cap 130. As shown in FIG. 8, the first flange 138 includes an arm engagement surface 170 located farther from the axis 129 than a cap opening 134. The arm engagement surface 170 cooperates with the contact arms 154 when the end cap 130 is attached to the terminal portion 128 (similar to the process described above in reference to FIG. 6), and pushes the contact arms 154 away from the axis 129. It should be appreciated that in the embodiment shown in FIG. 8, each contact arm 154 is shown in a respective pre-loaded position, which is different from the respective rest position. When the contact arm 154 is in its pre-loaded position, a respective contact area 158 is farther from the axis 129 than when the contact arm 154 is in its rest position. Additionally, when the contact arm 154 is in its pre-loaded position, a respective arm end 156 is farther from the axis 129 than when the contact arm 154 is in its rest position. It should be appreciated that when the contact arms 154 are in the pre-loaded positions, the minimum distance between the axis 129 and the contact portion 158 is limited by the engagement of the contact arm 154 and the first flange 138. Additionally, the illustrated engagement portions 158 are arranged generally on the circumference of an engagement circle 172 (visible as a line in FIG. 8 since it is shown edge on) that is co-axial with the axis 129. This is advantageous when the corresponding male pin terminal (not shown in FIG. 8) is inserted, as the corresponding male pin terminal is more likely to engage each of the contact arms 158 at approximately the same time.

While exemplary embodiments are described above, it is not intended that this describes all possible forms of the invention. Rather, the words used in the specification are words of description rather than limitation, and it is understood that various changes may be made without departing from the spirit and scope of the invention. Additionally, the features of implementing embodiments may be combined to form further embodiments of the invention.

Additionally, the illustrated charging system 10 is one illustrative, non-limiting example of an environment in which the connector assembly 18 is suitable for use. The connector assembly 18 and the connector terminal 22 may be used in other environments and for other purposes where an electrical connection is desired.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An electric connector comprising:
   a terminal body including a wall defining an interior space that extends along an axis;
   an electric contact located within the interior space, the electric contact including a contact base and a plurality of contact arms that extend from the contact base toward an outer end of the terminal body; and
   an end cap supported on the terminal body adjacent to the outer end, the end cap including a cap base that defines a cap opening that is co-axial with the interior space, the end cap including a flange that extends from the cap base in an inner direction into the interior space of the terminal body, the flange including an engagement tab that extends from the flange and engages a terminal groove located in the wall of the terminal body.

2. The electric connector of claim 1, wherein the flange extends completely around the cap opening.

3. The electric connector of claim 1, wherein the contact arms engage the end cap.

4. The electric connector of claim 3, wherein the contact arms are biased away from the axis by the end cap.

5. The electric connector of claim 1, wherein the flange is a second flange, the end cap further including a first flange that extends from the inner surface of the cap base into the interior space of the terminal body, and wherein the first flange defines the cap opening.

6. The electric connector of claim 5, wherein the first flange extends completely around the cap opening.

7. The electric connector of claim 6, wherein the second flange extends completely around the first flange.

8. The electric connector of claim 7, wherein the first flange is separated from the second flange by a cap groove.

9. The electric connector of claim 8, wherein the cap groove fully separates the first flange from the second flange.

10. The electric connector of claim 5, wherein the contact arms engage the first flange.

11. The electric connector of claim 10, wherein the contact arms are biased away from the axis by the first flange.

12. The electric connector of claim 11, wherein the second flange includes a second engagement tab that extends from the second flange in a direction generally opposite the engagement tab and engages a terminal groove located in a wall of the interior space.

13. The electric connector of claim 12, wherein the engagement tab has an arc length that is approximately 25% of the circumference of the second flange and the second engagement tab has an arc length that is approximately 25% of the circumference of the second flange.

14. The electric connector of claim 1, wherein the wall defining the interior space is an interior wall of the terminal body.

15. The electric connector of claim 14, wherein the terminal groove is located in the interior wall of the terminal body that defines the interior space.

16. An electric connector comprising:
    a terminal body defining an interior space extending along an axis;
    an electric contact located within the interior space, the electric contact including a contact base and a plurality of contact arms that extend from the contact base toward an outer end of the terminal body; and
    an end cap located on the outer end of the terminal body, the end cap including a cap base and a first flange that extends from the cap base in an inner direction parallel to the axis and into the interior space of the terminal body, the first flange defining a cap opening that is co-axial with the interior space, the end cap also including a second flange that extends from the cap base in the inner direction, the second flange describing a complete O-shape that extends completely around the cap opening, the second flange including an engagement tab that extends from the second flange in a radial direction away from the axis, the engagement tab located in a terminal groove located in a wall of the interior space of the terminal body such that the engagement tab engages the terminal body to prevent movement of the end cap relative to the terminal body in a direction parallel to the axis.

17. The electric connector of claim 16, wherein the contact arms engage the end cap.

18. The electric connector of claim 17, wherein the contact arms are biased away from the axis by the end cap.

19. An electric connector comprising:
    a terminal body defining an interior space extending along an axis;
    an electric contact located within the interior space, the electric contact including a contact base and a plurality of contact arms that extend from the contact base toward an outer end of the terminal body to respective arm ends; and
    an end cap located on the outer end of the terminal body, the end cap including a cap base and a first flange that extends from the cap base in an inner direction parallel to the axis and into the interior space of the terminal body, the first flange defining a cap opening that is co-axial with the interior space, the end cap also including a second flange that extends from the cap base in the inner direction, the second flange describing a complete O-shape that extends completely around the cap opening, the second flange including an engagement tab that extends from the second flange in a radial direction away from the axis, the engagement tab located in a terminal groove located in a wall of the interior space of the terminal body such that the engagement tab engages the terminal body to prevent movement of the end cap relative to the terminal body in a direction parallel to the axis;
    wherein the contact arms engage the first flange and are biased away from the axis by the first flange.

20. The electric connector of claim 19, further comprising a cap groove that fully separates the first flange from the second flange, and wherein the arm ends are located in the cap groove.

* * * * *